UNITED STATES PATENT OFFICE.

HORACE W. LASH, OF CLEVELAND, OHIO.

PROCESS OF REDUCING IRON OXIDS.

No. 856,351.      Specification of Letters Patent.      Patented June 11, 1907.

Application filed October 13, 1905. Renewed April 8, 1907. Serial No. 367,072.

*To all whom it may concern:*

Be it known that I, HORACE W. LASH, a citizen of the United States, residing at Cleveland, in the county of Cuyahoga and State of Ohio, have invented a certain new and useful Improvement in Processes of Reducing Iron Oxids, of which the following is a full, clear, and exact description, reference being had to the accompanying drawings.

My invention relates to the reduction of iron oxids to the condition of finished steel or to a partially refined metal suitable for the making of castings.

In the history of the art many attempts have been made to obtain iron from its ores without smelting the latter in the blast furnace, but as is known to everyone conversant with the matter, every attempt hitherto has failed signally and no process has hitherto been discovered which has been commercially operative or successful. I have, however, in my process, many times obtained all of the iron theoretically possible to obtain from the charge and have uniformly secured over 98 per cent. of the theoretical amount.

In carrying out my process I avail myself of the conditions prevailing in an electric furnace and use a charge comprising finely divided iron oxid mixed with finely divided cast or pig iron and finely divided carbon,—the proportions of the various ingredients being such as indicated below. I may also use a certain quantity of flux of such an amount as may be necessary from the nature of the charge and find that a marked advantage is derived from the addition of a small quantity of sawdust or equivalent material.

As it is necessary to have the iron oxid in a finely divided condition, the process is well adapted to the use of magnetic concentrates.

The metallic portion of the charge may be shotted or granulated cast or pig iron, or finely divided cast iron obtained from any source. It is, however, to be noted that this iron must be of the quality commonly designated as cast, or pig iron, as distinguished from the ordinary run of scrap, wrought iron, or steel, since it is important that it contain a high percentage of metalloids or easily oxidizable metals such as manganese, capable of uniting with the oxygen of the ore.

The carbon to be added is preferably in the form of ordinary coke and is finely ground, as are the other portions of the charge. I also preferably add a small proportion of readily combustible material such as crushed coal or sawdust. This latter addition is for the purpose of rendering the mass porous owing to its combustion taking place at an early stage of the process thereby leaving unfilled interstices throughout the mass. These various materials, together with suitable flux, are intimately mixed, either by grinding in a dry or wet pan, or by any other suitable means which will bring the particles into intimate contact. A binder may be added, if desired.

The prepared charge, either in the form of lumps, briquets, or in a loose condition, is charged into a suitable electric furnace, and the temperature raised to smelting heat. Under the influence of the heat, the sawdust or other readily combustible material, if present, disappears as such, leaving the mass to a certain extent porous. Upon the continued application of heat the metalloids and easily oxidizable metals contained in the cast iron and a portion of the carbon of the carbonaceous additions unite with the oxygen of the oxids present, thus reducing the iron of such oxids to metallic condition. The flux present performs its usual function and the entire quantity of iron, both the cast iron originally added and the iron reduced from the ores, is found in the form of a fused bath, containing a certain amount of metalloids which may be eliminated to the extent desired, by the usual treatment. By carrying on this operation in an electric furnace, the metalloids of the cast iron and the added carbon are protected from wasteful oxidation, since there is no flame or current of oxidizing gas flowing across the charge, the atmosphere above the bath being practically neutral.

I have found the following proportions to be eminently sucessful:—

| Charge. | Percentage iron obtained from total amount present in charge. |
|---|---|
| 16.00# ore | |
| 16.00 cast iron | |
| 2.00 carbon | |
| .50 lime stone | |
| .50 fluor spar | |
| .50 sawdust | 98.1 per cent. |
| 35.50 | |

| Charge. | Percentage iron obtained from total amount present in charge. |
|---|---|
| 12.00# ore | |
| 6.00 cast iron | |
| 2.00 carbon | |
| .25 lime stone | |
| .25 fluor spar | |
| .50 sawdust | 100. per cent. |
| 21.00 | |
| 18.00# ore | |
| 7.00 cast iron | |
| 2.00 carbon | |
| .25 lime stone | |
| .25 fluor spar | |
| .50 sawdust | 100. per cent. |
| 28.00 | |

From these examples, it will be seen that it is possible in operation to use cast iron of a weight almost as low as one third of that of the oxid. It is even possible to obtain satisfactory results by using a smaller percentage of additional carbon but it is not ordinarily advisable to do so, since it thereupon becomes necessary to use a greater proportion of cast iron, which for commercial reasons is not preferable. The presence of the free carbon, added preferably in the form of coke, seems to have the effect of protecting the metalloids contained in the cast iron against whatever oxidation by the atmosphere might possibly occur, thereby enabling said metalloids to be utilized as reducing agents for the iron oxid.

Having thus described my invention, I claim:

1. The method of reducing iron oxids comprising intimately mixing finely divided oxid of iron with finely divided cast iron and carbonaceous material, charging the same into an electric furnace and subjecting the mixture to a smelting heat.

2. The method of reducing iron oxids consisting in forming a charge of intimately mixed, finely divided cast iron and oxid of iron with additional carbonaceous material and fluxes, charging the same into an electric furnace, and subjecting the charge to a smelting heat in a non-oxidizing atmosphere.

3. The method of reducing iron oxids comprising subjecting a mixture of finely divided oxid of iron and finely divided cast iron and carbonaceous material to a smelting heat in a non-oxidizing atmosphere.

4. The method of reducing iron oxids consisting in forming a charge comprising a mixture of finely divided oxid, finely divided cast iron, carbon, and finely ground, readily combustible material, charging the same into an electric furnace, and subjecting the same to a smelting temperature.

In testimony whereof, I hereunto affix my signature in the presence of two witnesses.

HORACE W. LASH.

Witnesses:
J. M. WOODWARD,
E. B. GILCHRIST.